US012589520B2

(12) United States Patent
Sommer et al.

(10) Patent No.: US 12,589,520 B2
(45) Date of Patent: Mar. 31, 2026

(54) BINDER COMPOSITION, COMPRISING BASIC SUBSTANCES, FOR PRODUCING A LIGNOCELLULOSIC COMPOSITE, RESPECTIVE PROCESS, USE AND PRODUCTS

(71) Applicant: BASF SE, Ludwigshafen am Rhein (DE)

(72) Inventors: Gereon Antonius Sommer, Ludwigshafen am Rhein (DE); Stephan Weinkoetz, Ludwigshafen am Rhein (DE); David Tuerp, Ludwigshafen am Rhein (DE); Johannes Ahrens, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/875,750

(22) PCT Filed: Jun. 19, 2023

(86) PCT No.: PCT/EP2023/066440

§ 371 (c)(1),
(2) Date: Dec. 17, 2024

(87) PCT Pub. No.: WO2023/247431

PCT Pub. Date: Dec. 28, 2023

(65) Prior Publication Data

US 2025/0162192 A1 May 22, 2025

(30) Foreign Application Priority Data

Jun. 22, 2022 (EP) .................................... 22180559

(51) Int. Cl.
*B27N 3/02* (2006.01)
*B27N 3/00* (2006.01)
*B27N 3/20* (2006.01)

(52) U.S. Cl.
CPC ............... *B27N 3/02* (2013.01); *B27N 3/002* (2013.01); *B27N 3/203* (2013.01)

(58) Field of Classification Search
CPC .................................... B27N 3/02; B27N 3/00
See application file for complete search history.

(56) References Cited

U.S. PATENT DOCUMENTS

| | | | | |
|---|---|---|---|---|
| 2011/0135907 | A1* | 6/2011 | Shooshtari | C08J 5/244 428/326 |
| 2011/0190425 | A1* | 8/2011 | Swift | B27N 3/002 524/439 |
| 2011/0262648 | A1* | 10/2011 | Lee | C09J 179/02 427/372.2 |
| 2011/0311833 | A1* | 12/2011 | Parker | B27N 3/002 523/122 |
| 2014/0275361 | A1* | 9/2014 | Williamson | C09J 167/06 524/72 |
| 2017/0174836 | A1* | 6/2017 | Hampson | C09D 5/00 |
| 2020/0157344 | A1* | 5/2020 | Kim | C08G 69/08 |

FOREIGN PATENT DOCUMENTS

| | | | |
|---|---|---|---|
| EP | 3611225 | A2 | 2/2020 |
| WO | 2015/177114 | A1 | 11/2015 |

OTHER PUBLICATIONS

International Preliminary Report on Patentability received for PCT Patent Application No. PCT/EP2023/066440, mailed on May 15, 2024, 7 pages.
International Search Report and Written Opinion received for PCT Patent Application No. PCT/EP2023/066440, mailed on Oct. 4, 2023, 7 pages.

* cited by examiner

*Primary Examiner* — Andrew D Graham
(74) *Attorney, Agent, or Firm* — Faegre Drinker Biddle & Reath LLP

(57) ABSTRACT

Described herein is a process for producing a lignocellulosic composite, a binder composition suitable for use in said process, as well as a lignocellulosic composite which can be produced by the process of the invention, and its use. Moreover is described herein a kit for producing a binder composition for use in the production of a lignocellulosic composite and a respective use of such binder composition.

12 Claims, No Drawings

BINDER COMPOSITION, COMPRISING BASIC SUBSTANCES, FOR PRODUCING A LIGNOCELLULOSIC COMPOSITE, RESPECTIVE PROCESS, USE AND PRODUCTS

CROSS-REFERENCE TO RELATED APPLICATIONS

This application is a National stage application (under 35 U.S.C. § 371) of PCT/EP2023/066440, filed Jun. 19, 2023, which claims benefit of European Application No. 22180559.1, filed Jun. 22, 2022, both of which are incorporated herein by reference in their entirety.

The present invention relates to a process for producing a lignocellulosic composite, a binder composition suitable for use in said process, as well as a lignocellulosic composite which can be produced by the process of the invention, and its use. Moreover, the present invention relates to a kit for producing a binder composition according to the present invention, for use in the production of a lignocellulosic composite, and to the respective use of such binder composition.

Generally, in a process of producing a multilayer or single-layer lignocellulosic composite, a mixture of lignocellulosic particles (i.e. particles consisting essentially of lignocellulose) and a binder is provided or prepared. This mixture is typically scattered, e.g. to give a first layer of a multilayer mat or to give a single-layer mat. When producing a multilayer composite, successively two or more mixtures of lignocellulosic particles are scattered to give a mat with two or more individual layers. The resulting mat is then compacted, and the compacted mat or mixture is hardened during or after compaction, i.e. the mixture is treated in a manner so that the binder undergoes a hardening process.

There is a demand in industry for an improved process of producing a multilayer or single-layer lignocellulosic composite, wherein binder components can be used which can be obtained to the highest possible extent from non-petrochemical, preferably from renewable, resources, and which are suitable to reduce or avoid potentially hazardous substances like formaldehyde and isocyanates or substances which emit formaldehyde, during or after the production process of the composites, like e.g. N-methylol compounds.

The following literature deals with certain aspects of processes of producing multilayer or single-layer lignocellulosic composites:

Document US 2011/0262648 A1 describes durable thermosets from reducing sugars and primary polyamines.

Document WO 2015/177114 A1 pertains to a water-soluble carbohydrate-polyamino acid-based pre-reacted binder composition.

Document EP 3611225 A2 deals with a binder composition, an article and a method for manufacturing an article.

In the light of the existing prior art, there is still a need for an improved process of producing a multilayer or single-layer lignocellulosic composite, wherein binder components are used as much as possible which can be obtained from non-petrochemical resources, preferably from renewable resources, and wherein hazardous or potentially hazardous substances are reduced or avoided.

Correspondingly, it was a primary object of the present invention to provide an improved process of producing a multilayer or single-layer lignocellulosic composite, in particular a process wherein the resulting lignocellulosic composite has an increased strength when compared to a similar lignocellulosic composite not produced according to the process of the present invention, or wherein shorter heating and/or press times are required for obtaining a lignocellulosic composite which has a strength comparable to a similar lignocellulosic composite not produced according to the process of the present invention.

It was a further object of the present invention to provide a binder composition suitable for use in an improved process of producing a multilayer or single-layer lignocellulosic composite, as well as a lignocellulosic composite resulting from said process.

A still further object of the present invention was to provide a process of producing a multilayer or single-layer lignocellulosic composite and a respective binder composition wherein the binder composition would comprise a proportion of bio-based components, which should be as high as possible, in order to reduce or avoid the emission of hazardous or otherwise undesired volatile compounds during or after production, and to allow for safe disposal and/or a reduction of potentially environmentally harmful waste.

It has now been found that the primary object and other objects of the present invention can be accomplished by a process for producing a lignocellulosic composite comprising one (in particular a "single-layer lignocellulosic composite") or more lignocellulosic composite layers (in particular a "multilayer lignocellulosic composite"), comprising at least the following steps:

S1) providing or preparing a mixture, at least comprising:
  lignocellulosic particles
  and
  a binder composition, preferably an aqueous binder composition (i.e. a binder composition comprising water), comprising as components, preferably for hardening the binder or binder composition, at least:
    c1) one or more amino acid polymers having two or more primary amino groups,
    wherein preferably the one or more amino acid polymers having two or more primary amino groups are polymerization products of amino acid monomers and optionally other monomers,
    c2) one or more alpha-hydroxy carbonyl compounds and
    c3) one or more basic substances having a $pK_B$-value of ≤3, S2) compacting the mixture from step S1) to receive a compacted mixture, and S3) applying heat and/or pressure to the mixture, preferably during and/or after compacting, in step S2), so that the binder of the binder composition (preferably the curable components of the binder or binder composition) hardens and a lignocellulosic composite (or a layer of a multilayer lignocellulosic composite) results.

The invention as well as preferred variants and preferred combinations of parameters, properties and elements thereof are defined in the appended claims. Preferred aspects, details, modifications and advantages of the present invention are also defined and explained in the following description and in the examples shown below.

It has now been found by the present inventors (and it is shown in the examples below) that the process of producing a multilayer or single-layer lignocellulosic composite according to the present invention as described herein shows certain improvements over similar processes known from the prior art. In particular, said process according to the present invention results in a lignocellulosic composite with an increased strength (increased internal bond strength) when compared to a similar lignocellulosic composite not produced according to the process of the present invention, or wherein shorter heating and/or press times are required for obtaining a lignocellulosic composite with comparable strength as a similar lignocellulosic composite which was not produced according to the process of the present invention.

If not stated otherwise, preferred embodiments, aspects or features of the present invention can be combined with other embodiments, aspects or features, especially with other preferred embodiments, aspects or features, irrespective of the categories to which the embodiments, aspects or features relate. The combination of preferred embodiments, aspects or features with other preferred embodiments, aspects or features in each case again results in preferred embodiments, aspects or features.

As used herein, the term "lignocellulosic particles" designates and includes any type, size and shape of lignocellulosic particles, such as fibers, chips, strands, flakes, sawmill shavings and saw dust or mixtures thereof. In addition, any type of lignocellulosic biomass such as birch, beech, alder, pine, spruce, larch, eucalyptus, linden, poplar, ash, fir, tropical wood, sisal, jute, flax, coconut, kenaf, hemp, banana, straw, cotton stalks, bamboo and the like can be used as a source for said lignocellulosic particles. Lignocellulosic particles from both virgin wood and/or waste wood, such as old furniture, can be used to produce the lignocellulosic composite of the present invention. According to the present invention, it is further possible to use mixtures of different types of lignocellulosic particles in the production of a lignocellulosic composite.

As used herein, the term "single-layer lignocellulosic composite" (i.e. a lignocellulosic composite comprising one lignocellulosic composite layer) designates and includes any single-layered composite material which contains lignocellulosic particles and a hardened binder that binds the lignocellulosic particles. Furthermore, the term "single-layer" specifies that the lignocellulosic composite comprises only one layer of lignocellulosic material and binder, wherein the single layer preferably is produced by a process comprising a single step of scattering lignocellulosic particles. The "single-layer lignocellulosic composite" can be of any shape such as rectangular, square, round, triangular and the like. The "single-layer lignocellulosic composite" can also be of any thickness, density and colour as long as it contains lignocellulosic particles and a hardened binder. The "single-layer lignocellulosic composite" can also comprise several other compounds different from lignocellulosic particles and binders. The lignocellulosic particles used in the production of a "single-layer lignocellulosic composite" are of the same type or of different types of lignocellulosic biomass (see above for preferred types).

As used herein, the term "multilayer lignocellulosic composite" (i.e. a lignocellulosic composite comprising more than one lignocellulosic composite layers) designates and includes any multi layered composite which contains lignocellulosic particles and a hardened binder that binds the lignocellulosic particles and wherein distinguishable (individual) layers are present within the composite. The multilayer lignocellulosic composite preferably comprises at least two distinguishable (individual) layers, in particular a core layer and an upper and a lower surface layer, or four or more layers within the same composite material. The adjacent layers of the multilayer lignocellulosic composite are distinguishable in terms of their composition, density, colour or any other properties and adjacent layers comprise identical types of lignocellulosic particles and/or binders or different types of lignocellulosic particles and/or binders. The (individual) layers may also comprise or consist of different materials than lignocellulosic particles and/or binders, such as plastics, fabrics, paint coat or the like, for examples derived from foreign matter in waste wood. The lignocellulosic particles used in the production of an individual layer of a "multilayer lignocellulosic composite" are of the same type or of different types of lignocellulosic biomass (see above for preferred types). The lignocellulosic particles used in the production of separate (individual) layers of a "multilayer lignocellulosic composite" are of the same type or of different types of lignocellulosic biomass (see above for preferred types) or are identical or different mixtures of two or more of such types of lignocellulosic biomass. Furthermore, the term "multilayer" specifies that the lignocellulosic composite comprises at least two individual layers, wherein at least one, preferably two or more of these individual layers comprise lignocellulosic material and binder, wherein one or more or all of said layers preferably are produced in a multi-step-process comprising for each (individual) layer of lignocellulosic material and binder a step of scattering lignocellulosic particles.

As used herein the term "amino acid polymer(s) having two or more primary amino groups" (of component c1) of the binder composition) designates a polymer compound (viz. one or more polymer compounds) which is (viz. are) a polymerization product (viz. polymerization products) of amino acids (preferably of amino acid monomers, more preferably of two or more amino acid monomers) and optionally other monomers (wherein the monomers of the polymer compound are preferably connected with or bound to each other via amide bonds), preferably selected from the group consisting of a) amines comprising at least two amino groups, wherein the amines are not amino acids, and
b) organic compounds having at least two carboxyl groups, preferably selected from the group consisting of organic dicarboxylic acids and organic tricarboxylic acids, wherein preferably the organic compounds having at least two carboxyl groups are not amino acids, wherein preferably at least 50 wt.-%, preferably at least 75 wt.-%, preferably at least 85 wt. %, preferably at least 90 wt.-%, preferably at least 95 wt.-%, preferably at least 97.5 wt.-%, preferably at least 99 wt.-%, preferably 100 wt.-%, amino acids (preferably amino acid monomers) are used as monomers for the polymerization reaction, based on the total (weight) amount of monomers forming the amino acid polymer(s) having two or more primary amino groups.

As used herein, the terms "wt.-%" and "mass-%" are used synonymously.

Generally and for the purpose of the present invention, said amino acid polymer(s) having two or more primary amino groups may comprise or consist of dimers (n=2), trimers (n=3), oligomers (n=4-10) and/or macromolecules (n>10), wherein n is the number of monomers (preferably of amino acid monomers) which have been reacted to form the dimers, trimers, oligomers and macromolecules of the amino acid polymer(s) having two or more primary amino groups.

The skilled person will select the monomers for producing said amino acid polymer(s) having two or more primary amino groups so as to receive desired amino acid polymer(s) having two or more primary amino groups.

As used herein, the term "amino acid polymer(s) having two or more primary amino groups" also includes derivatives, which are obtained by modification of the amino acid polymer(s) having two or more primary amino groups after polymer synthesis. Said modifications may be performed by reaction with the following reagents:

i) alkyl- or alkenylcarboxylic acids, such as for example octanoic acid, nonanoic acid, decanoic acid, dodecanoic acid, hexadecenoic acid, stearic acid, oleic acid, linoleic acid and/or linolenic acid and/or or their Li, Na, K, Cs, Ca or ammonium salts, and/or ii) polyalkylene oxides which are terminated by amino groups and/or acid groups and have a functionality of one, two or more, preferably polyethylene oxides, polypropylene oxides and/or polyethylene-propylene oxide, and/or iii) alkylene oxides, such as ethylene oxide, propylene oxide and/or butylene oxide and/or iv) lactones, e.g. epsilon-caprolactone, delta-valerolactone, gamma-butyrolactone and/or v) alcohols, such as alkanoles, for example oleyl alcohol.

Amino acid(s) which may be present as monomers in the amino acid polymer(s) having two or more primary amino groups are organic compounds comprising at least one primary amine (—$NH_2$) functional group and at least one carboxyl (—COOH) functional group. Said amino acid(s) are preferably selected from the group consisting of lysine, histidine, isoleucine, leucine, methionine, phenylalanine, threonine, tryptophan, valine, arginine, aspartic acid, glutamic acid, serine, asparagine, glutamine, cysteine, selenocysteine, glycine, alpha-alanine, beta-alanine, tyrosine, gamma-aminobutyric acid, epsilon-aminocaproic acid, ornithine, diaminopimelic acid, 2,3-diaminopropionic acid, 2,4-diaminobutyric acid or mixtures thereof. The amino acids can be used in their L- or D- or racemic form. The amino acids may also be used in their cyclic lactam form, e.g. epsilon-caprolactam.

Preferred amino acids which are used for the polymerization reaction (as monomers for forming said amino acid polymer(s) having two or more primary amino groups) are diamino acids, comprising two amine groups, preferably two primary amine groups (—$NH_2$), and at least one carboxyl (—COOH) group. Such diamino acids are preferably selected from the group consisting of ornithine, diaminopimelic acid, 2,3-diaminopropionic acid, 2,4-diaminobutyric acid and lysine. Lysine is preferred as amino acid monomer for forming said amino acid polymer(s) having two or more primary amino groups. L-lysine is even more preferred for this purpose.

Preferably, the amino acid polymer(s) having two or more primary amino groups have a weight-average molecular weight in the range from of 800 g/mol≤$M_w$≤10000 g/mol, preferably of 1000 g/mol≤$M_w$≤8000 g/mol, more preferably of 1000 g/mol≤$M_w$≤5000 g/mol and yet more preferably of 1000 g/mol≤$M_w$≤3500 g/mol.

Said amino acid polymer(s) having two or more primary amino groups can be linear or branched or partially linear and partially branched.

Preferred amino acid polymer(s) having two or more primary amino groups for the purpose of the present invention are described below.

As used herein, the term "alpha-hydroxy carbonyl compounds" (of component c2) of the binder composition) designates compounds which are capable of reacting with amine compounds, and optionally further crosslinkers, in order to form a hardened binder. The alpha-hydroxy carbonyl compounds may comprise at least one reducing sugar.

The term "reducing sugar" indicates one or more sugars that contain free aldehyde groups, or that can isomerize, i.e. tautomerize, to contain free aldehyde groups, in accordance with the usual meaning in the technical field.

For use in the binder composition in component c2) such alpha hydroxycarbonyl compound(s) must be capable of reacting with the amino acid polymers having two or more primary amino groups used in component c1).

The binder composition comprises as components, preferably for hardening the binder or binder composition, components c1), one or more amino acid polymers having two or more primary amino groups, and c2), one or more alpha-hydroxy carbonyl compounds. Components c1) and c2) are also referred to herein as "curable components", preferably as "heat-curable components" of the binder or binder composition. More specifically, components c1) and c2) are also referred to herein collectively as "binder", and separately as "curable components", preferably as "heat-curable components", of the binder.

Preferred is a process of the present invention as described herein (or a process of the present invention as described herein as being preferred), wherein the one or at least one of the more alpha-hydroxy carbonyl compounds of component c2) is selected from the group consisting of: glycolaldehyde, glyceraldehyde, 1,3-dihydroxyacetone, hydroxyacetone, arabinose, xylose, glucose (dextrose), mannose, fructose, saccharose, ribose, lyxose, galactose, allose, altrose, talose, gulose, idose, psicose, sorbose, maltodextrin, tagatose and mixtures thereof.

More preferred alpha-hydroxy carbonyl compounds for the purpose of the present invention are described below.

As used herein, the term "basic substances having a $pK_B$-value of ≤3" comprises organic and inorganic substances. Preferred are for the purposes of the present invention inorganic basic substances having a $pK_B$-value of ≤3, in particular inorganic hydroxides. More preferred basic substances having a $pK_B$-value of ≤3 for the purpose of the present invention are described below.

Preferred is a process of the present invention as described herein (or a process of the present invention as described herein as being preferred), wherein the one or more amino acid polymers of component c1) of the binder composition comprise or are one or more polylysines, wherein preferably the one or more polylysines have a weight-average molecular weight $M_w$ of ≥800 g/mol, preferably of ≥1000 g/mol, more preferably of ≥1150 g/mol;

and/or have a weight-average molecular weight $M_w$ of ≤10000 g/mol, preferably of ≤8000 g/mol, more preferably of ≤5000 g/mol and yet more preferably of ≤3500 g/mol;

and/or have a weight-average molecular weight $M_w$ in the range of 800 g/mol≤$M_w$≤10000 g/mol, preferably of 1000 g/mol≤$M_w$≤8000 g/mol, more preferably of 1000 g/mol≤$M_w$≤5000 g/mol and yet more preferably of 1000 g/mol≤$M_w$≤3500 g/mol;

and/or comprise as monomers integrated in their polymer structure ≥10 mass-%, preferably 20 mass-%, of lysine monomers, based on the total mass of the polymer;

and/or comprise as monomers integrated in their polymer structure at least 85 mass-%, preferably at least 95 mass-%, more preferably at least 99 mass-%, and yet even more preferably 100 mass-%, of lysine monomers, based on the total mass of the polymer structure.

Preferably, the wt.-% proportion (weight percentage) or mass-% proportion (mass percentage) of lysine (monomers), preferably of L-lysine, in the one or more polylysines can be determined in a manner known per se, e.g. by complete hydrolysis of the polylysine and subsequent analysis of the resulting monomers by HPLC/MS.

Weight-average molecular weights $M_w$ of the one or more amino acid polymers having two or more primary amino groups, including of polylysines, are preferably determined by size exclusion chromatography (SEC), as is generally known in the field and specified in more detail in the examples section below.

Said one or more polylysines can be linear or branched or partially linear and partially branched.

As used herein, the term “poylysine(s)” designates a polymerization product of the monomer lysine, preferably of L-lysine, and optionally further monomers selected from the group consisting of a) amino acids, b) amines comprising at least two amino groups, wherein the amines are no amino acids, and c) dicarboxylic acids, which are no amino acids and tricarboxylic acids, which are no amino acids, wherein preferably the proportion of lysine in mass-% (wt.-%), which is used as monomer for the polymerization reaction for producing the polylysine, based on the total amount of monomers used for the polymerization reaction for producing the polylysine, is 10 mass-%, preferably 20 mass-%, or at least 85 mass-%, preferably at least 95 mass-%, more preferably at least 99 mass-%, and yet even more preferably 100 mass-%, of lysine, is used as the monomer for the polymerization reaction for producing said polylysine, based on the total amount of monomers used.

Preferred as polylysine(s) for the purpose of the present invention are homopolymers of lysine, preferably homopolymers of L-lysine.

Generally and for the purpose of the present invention, polylysine may comprise or consist of dimers (n=2), trimers (n=3), oligomers (n=4-10) and/or macromolecules (n>10), wherein n is the number of lysine monomers which have been reacted to form the dimers, trimers, oligomers and macromolecules of the polylysine(s). Additionally, lysine monomers may be present in a limited amount in a mixture with the polylysine, e.g. due to incomplete conversion of the monomers during the polymerization reaction for producing polylysine.

In the present text, the term polylysine preferably also includes polylysine derivatives, which are prepared by or can be prepared by a modifying reaction of (i) the amino groups present in the polylysine obtained by polymer synthesis with (ii) electrophiles like carboxylic acid, epoxides, and lactones, wherein the total amount of amino groups reacted in the modifying reaction is 20% or lower, preferably 10% or lower, based on the total amount of amino groups in the polylysine obtained in the polymer synthesis (i.e., before modification).

It has been found in own experiments that a process according to the present invention, wherein the binder composition comprises amino acid polymers having two or more primary amino groups, in particular polylysine(s), as component c1), is suitable for producing lignocellulosic composites which show an increased strength (or which require shorter press times for achieving a similar strength) when compared with similar lignocellulosic composites wherein other amino-functionalized compounds are used in the binder composition.

For example, it is reported in WO 2015/177114 A1 that a binder composition comprising lysine monomer and hexamethylene diamine (HMDA) as amino-functionalized components could not be hardened satisfactorily in the presence of reducing sugars and sodium hydroxide.

Also preferred is a process of the present invention as described herein (or a process of the present invention as described herein as being preferred), wherein the one or at least one of the more alpha-hydroxy carbonyl compounds of component c2) of the binder composition is selected from the group consisting of glycolaldehyde, glyceraldehyde, 1,3-dihydroxyacetone, hydroxyacetone, arabinose, xylose, glucose, mannose, fructose, saccharose and mixtures thereof, preferably selected from the group consisting of glycolaldehyde, glyceraldehyde, 1,3-dihydroxyacetone, hydroxyacetone, and mixtures thereof;

wherein more preferably the one or at least one of the more alpha-hydroxy carbonyl compounds is hydroxyacetone;

and/or the ratio of (i) the total mass of the one or more amino acid polymers of component c1) of the binder composition: (ii) the total mass of the one or more alpha-hydroxy carbonyl compounds of component c2) of the binder composition or used for the preparation of the binder composition is in the range of ≥60:40 to ≤90:10, preferably of ≥65:35 to ≤80:20 and more preferably of ≥65:35 to ≤75:25.

It has been found in own experiments that particularly high internal bond strengths could be achieved in lignocellulosic composites produced by the process according to the present invention when hydroxyacetone (also known as 1-hydroxy-2-propanone, CAS RN 116-09-6) was used as alpha-hydroxy carbonyl compound of component c2), or that shorter press times were required for achieving a defined internal bond strength, when compared with the use of a similar binder wherein another alpha-hydroxy carbonyl compound than hydroxyacetone is used. Particularly good results (in terms of internal bond strength and/or reduced press times) are achieved in the process according to the present invention when polylysine(s) is/are used as component c1) of the binder composition and hydroxyacetone is used as component c2) of the binder composition.

Similarly, it has been found in own experiments that best practical results for lignocellulosic composites produced by the process according to the present invention were achieved when the ratio of (i) the total mass of the one or more amino acid polymers of component c1) of the binder composition: (ii) the total mass of the one or more alpha-hydroxy carbonyl compounds of component c2) of the binder composition was selected in the preferred ranges outlined above.

A process of the present invention as described herein is also preferred (or a process of the present invention as described herein as being preferred), wherein the one or more basic substances having a $pK_B$-value of ≤3 are one or more substances having a $pK_B$-value of ≤2.5, preferably having a $pK_B$-value of ≤2;

and/or the one or at least one of the more, preferably all of the more, basic substances having a $pK_B$-value of ≤3 are selected from the group consisting of:

alkali metal hydroxides, preferably selected from the group consisting of LiOH, NaOH, KOH and mixtures thereof; more preferably NaOH;

and earth alkali metal hydroxides, preferably selected from the group consisting of $Mg(OH)_2$ and $Ca(OH)_2$ and mixtures thereof, more preferably $Ca(OH)_2$;

and/or the total amount of component c3), the one or more basic substances having a $pK_B$ value of ≤3, (preferably selected from the group consisting of alkali metal hydroxides and earth alkali metal hydroxides as defined above) of the binder composition or used for the preparation of the binder composition is in the range of from ≥3 to ≤9 mass-%, preferably of from ≥4 to ≤8 mass-% and more preferably in the range of from ≥5 to ≤7 mass-%, relative to the total amount of component c1), the one or more amino acid polymers of the binder composition, and component c2), the one or more alpha-hydroxy carbonyl compounds of the binder composition.

It has furthermore been found in own experiments that the use of one or more basic substances having a $pK_B$-value of ≤3 in the process according to the present invention resulted in a still further improvement of internal bond strengths of lignocellulosic composites (or a reduction in press times for achieving a defined internal bond strength, respectively) produced by the process of the present invention, irrespective of e.g. the alpha-hydroxy carbonyl compound used as component c2).

Moreover, a process of the present invention as described herein is preferred (or a process of the present invention as described herein as being preferred), wherein the binder composition provided or prepared in step S1) further comprises a carrier liquid, preferably water, wherein preferably component c1), the one or more amino acid polymers, is present in or used for the preparation of the binder composition in a total amount in the range of from ≥20 to ≤50 mass-%, preferably of from ≥25 to ≤45 mass-% and more preferably of from ≥25 to ≤40 mass-%, relative to the totalized mass of components c1) to c3) and carrier liquid, and/or component c2), the one or more alpha-hydroxy carbonyl compounds, is present in or used for the preparation of the binder composition in a total amount in the range of from 3 to ≤20 mass-%, preferably of from ≥5 to ≤15 mass-% and more preferably of from 7 to ≤12 mass-%, relative to the total mass of components c1) to c3) and carrier liquid.

It has been found in own experiments that best practical results for lignocellulosic composites produced by the process according to the present invention were achieved when the binder composition had the above-defined proportions of components c1) and/or c2).

In addition is preferred a process of the present invention as described herein (or a process of the present invention as described herein as being preferred), wherein in the mixture provided or prepared in step S1) of the process, the total amount of component c1), the one or more amino acid polymers of the binder composition, and of component c2), the one or more alpha-hydroxy carbonyl compounds of the binder composition, is present in or used for the preparation of the binder composition in the range of from ≥3 to 8 mass-%, preferably of from ≥3.5 to ≤7.5 mass-%, and more preferably of from ≥4 to 6.5 mass-%, relative to the total amount of the lignocellulosic particles in an oven-dry state of the mixture.

It was surprising that, with a relatively low total amount of components c1) and c2) as specified above, lignocellulosic composites can be obtained which are stable and robust enough for the use as lignocellulosic composite boards in many applications, e.g. in the furniture industry.

Generally, in step S1) for preparing said mixture, said lignocellulosic particles may be blended with one or more or all components of the binder composition and/or one or more or all components of the binder composition may be sprayed onto said lignocellulosic particles, while before blending or spraying said components of the binder composition are pre-mixed or not pre-mixed.

A process of the present invention as described herein is, however, preferred (or a process of the present invention as described herein as being preferred), wherein in step S1) components c1), the one or more amino acid polymers having two or more primary amino groups, and c3), the one or more basic substances having a $pK_B$-value of ≤3, are premixed with each other, and subsequently the resulting pre-mixture is contacted with said lignocellulosic particles, preferably is sprayed onto said lignocellulosic particles, wherein preferably component c2), the one or more alpha-hydroxy carbonyl compounds, is contacted separately from said pre-mixture with said lignocellulosic particles, preferably sprayed separately onto said lignocellulosic particles, preferably so that said mixture results.

Preferably, the pre-mixture comprising components c1), the one or more amino acid polymers having two or more primary amino groups, and c3), the one or more basic substances having a $pK_B$-value of ≤3, and preferably water (thus resulting in an aqueous pre-mixture) has a pH value (after preparation, preferably directly after preparation, and before contacting said pre-mixture with said lignocellulosic particles and/or with component c2)) has a pH value in the range of from 10 to 14, preferably of from 11 to 14 and more preferably of from 11 to 13. Preferably, the pH value of said pre-mixture, preferably of said aqueous premixture, is determined using an ion-sensitive field-effect transistor sensor (preferably of the type "Tophit CPS441" by Endress+Hauser, Germany) at 22° C.

In the process of the present invention, the binder composition may additionally comprise one, two or more compounds independently selected from the group consisting of alkali salts and alkaline earth salts (preferably sodium nitrate), hydrophobizing agents (preferably paraffin and mixtures comprising paraffin more preferably paraffin emulsions), dyes, pigments, antifungal agents, antibacterial agents, rheology modifiers, fillers, release agents, surfactants and tensides.

Preferred is a process of the present invention (preferably as defined herein above as being preferred), wherein the process of producing a lignocellulosic composite comprises steps that are carried out batchwise and/or steps that are carried out continuously. Thus, the process of the present invention is suitable for a large variety of different production facilities and offers numerous options for the production of the desired lignocellulosic composite, i.e. multilayer lignocellulosic composite comprising one or more, preferably two or more, lignocellulosic composite layers or a single-layer lignocellulosic composite. As a preferred process of the present invention a batchwise production is chosen to produce individual lignocellulosic composites, e.g. having different shapes, thicknesses and the like, while a completely continuous process is preferably chosen for the production of more uniform lignocellulosic composites, e.g. having similar shapes, thicknesses and the like.

The preferred process of the present invention can also, and preferably, comprise one or more steps that are carried out batchwise, and one or more steps that are carried out continuously. One preferred example of such a combined process is the production of a single-layer lignocellulosic composite in continuously conducted process steps, and the subsequent batchwise (and preferably individual) production of a multilayer lignocellulosic composite using said continuously produced single-layer lignocellulosic composite as a starting material, e.g. as a core layer of said multilayer lignocellulosic composite.

A process of the present invention as described herein is also preferred (or a process of the present invention as described herein as being preferred), wherein the lignocellulosic composite is a lignocellulosic board selected from the group consisting of

- high-density fiberboard (HDF);
- medium-density fiberboard (MDF);
- low-density fiberboard (LDF);
- wood fiber insulation board;
- oriented strand board (OSB);
- chipboard; and
- natural fiber board, preferably with fibers from the group consisting of sisal, jute, flax, coconut, kenaf, hemp, banana, and mixtures thereof;

wherein the lignocellulosic board is a

- single-layer lignocellulosic board or
- multilayer lignocellulosic board, preferably a multilayer lignocellulosic board having a core layer and having an upper surface layer and a lower surface layer.

According to a preferred aspect of the process according to the present invention, the production process results in a lignocellulosic composite, that is preferably a single-layer lignocellulosic board or a multilayer lignocellulosic board, more preferably is a multilayer lignocellulosic board. The multilayer lignocellulosic board is more preferably a board having at least a core layer as well as an upper surface layer and a lower surface layer. The total number of layers is then three or more. If the number of layers is four or more, there are one or more intermediate layers. Preferred is a three-layer board having one core layer, an upper surface layer and a lower surface layer.

Consequently, a preferred aspect of the present invention relates to a process for the production of a high-density fiberboard (HDF), a medium-density fiberboard (MDF), a low-density fiberboard (LDF), a wood fiber insulation board, an oriented strand board (OSB), a chipboard or a natural fiber board, wherein the board preferably is either a single-layer lignocellulosic board or a multilayer lignocellulosic board, more preferably a multi-layer lignocellulosic board, most preferably a three-layer lignocellulosic board.

In step S3) of the process of the present invention, heat and/or (preferably "and") pressure are applied to the mixture, preferably during and/or after compacting the mixture in step S2) (preferably during and after compacting the mixture in step S2) or after compacting the mixture in step S2)), so that the binder of the binder composition hardens and a lignocellulosic composite results.

Preferably, a temperature in the range of from 80 to 300° C., more preferably of from 120 to 280° C. and even more preferably of from 150 to 250° C. is applied in step S3) and/or (preferably "and") a pressure in the range of from 0.1 to 10 MPa, preferably of from 0.5 to 8 MPa and more preferably of from 1 to 6 MPa is applied in step S3).

Preferably, the temperature applied in step S3) is measured in the center of the (three-dimensional) lignocellulosic composite resulting at the end of step S3). The lignocellulosic composite ("board") can be cooled down in a star cooler or more slowly by hot stacking.

For example, step S3) may be conducted in a conventional hot press. The measurement of the temperature in the center of the lignocellulosic composite can be carried out according to known methods, in particular according to the method described by Meyer/Thoemen, Holz als Roh-und Werkstoff [European Journal of Wood and Wood Products](2007) 65, p. 49-55, or Thoemen, 2010, "Vom Holz zum Werkstoff—grundlegende Untersuchungen zur Herstellung und Struktur von Holzwerkstoffen [From wood to materials—basic investigations for the preparation and the structure of wood-based materials]", ISBN 978-3-9523198-9-5, page 24 to 30 and page 78 to 85. For the wireless measurement of the temperature sensors such as the CONTI LOG—or EASY-log-sensors of the Fagus-Grecon Greten GmbH& Co. KG can be used, which can be inserted in the mixture for producing the lignocellulosic composite, e.g. during or after step S1).

In a preferred variant of the process of the present invention, step S3) comprises applying a high-frequency electrical field to the mixture, preferably during and/or after compacting in step S2), so that the binder hardens and binds the lignocellulosic particles, so that a lignocellulosic composite (or a layer of a multilayer lignocellulosic composite) results.

The term "high-frequency electrical field" as used herein designates and includes any kind of high-frequency electrical or electromagnetic field such as microwave irradiation or a high-frequency electrical field, which results after applying a high-frequency alternating voltage at a plate capacitor between two capacitor plates. Suitable frequencies for the high-frequency electrical field are in the range of from 100 kHz to 30 GHz, preferably 6 MHz to 3 GHz, more preferably 13 MHz to 41 MHz. Especially suitable and preferred are the respective nationally and internationally approved frequencies such as 13.56 MHz, 27.12 MHz, 40.68 MHz, 2.45 GHz, 5.80 GHz, 24.12 GHz, more preferably 13.56 und 27.12 MHz. The electrical power used to create such a high-frequency electrical field in the processes of the present invention preferably is in the range of from 10 to 10.000 kWh, more preferably of from 100 to 5.000 kWh, most preferably of from 500 to 2.000 kWh.

Preferred is a process of the present invention as described herein (or a process of the present invention as described herein as being preferred), wherein the process of producing a lignocellulosic composite comprises one, two, three, more than three, or all of the following steps

- preparing, preferably preparing by scattering, a layer of the mixture provided or prepared in step S1), and in step S2) compacting this layer,
- for preparing a multilayer lignocellulosic composite comprising one or more lignocellulosic composite layers, providing or preparing at least a first and a second individual mixture, and using said first and second individual mixtures for making a first and a second layer of the multilayer lignocellulosic composite, wherein the first and the second layer preferably are in contact with each other, and/or wherein the first and the second individual mixture have the same composition or have different compositions,
- for preparing a multilayer lignocellulosic composite, preparing two or more layers, preferably preparing two or more layers by scattering individual layers on top of each other, each layer comprising lignocellulosic particles and a binder, wherein in the two or more layers the lignocellulosic particles and/or the binders are the same or different, in step S2) compacting the mixture in two stages, wherein in the first stage the mixture is pre-compacted to give a pre-compacted mat, and wherein in the second stage this pre-compacted mat is further compacted;

during or after compacting in step S2), hot pressing the mixture, and applying in step S3) a temperature in the range of from 80 to 300° C. and a pressure in the range of from of 0.1 to 10 MPa to the mixture, preferably to the compacted mixture from step S2).

According to preferred aspects of the process of the present invention, the process of the present invention for producing a lignocellulosic composite comprises one, two, three or more preferred steps, which are either specific embodiments of steps S1), S2), or S3), respectively, or are additional steps. Each of these preferred steps is optional and can be conducted individually or in combination with one or more of the other preferred steps.

One of the preferred steps relates to step S1) of preparing said mixture comprising or consisting of said lignocellulosic particles and said binder composition. According to this preferred aspect, the lignocellulosic particles are blended with one or more or all components of the binder composition or one or more or all components of the binder composition are sprayed onto said lignocellulosic particles. Specifically components of the binder composition are blended with or sprayed onto the lignocellulosic particles simultaneously (e.g. in a mixture with each other) or successively, preferably successively, as is further specified and outlined above.

Another preferred step of the present invention is the step of preparing, preferably preparing by scattering, a layer of the mixture provided or prepared in step S1), and in step S2) compacting this layer. The preparation of a layer by scattering is a preferred additional step for the production of a lignocellulosic composite.

According to a preferred aspect of the present invention, for preparing a multilayer lignocellulosic composite, at least a first and a second individual mixture are provided or prepared. Said first and second individual mixtures are then used for making a first and a second layer of the multilayer lignocellulosic composite. Preferably, the first and the second layer are in contact with each other. According to this preferred aspect, the first and the second individual mixture have the same or a different composition, even more preferably the first and the second individual mixture have a different composition. Thus, the different individual mixtures and/or layers of the prepared multilayer lignocellulosic composite preferably differ in specific properties such as density, color, and the like and/or they differ in terms of their composition, wherein differing compositions are obtained by using different binders, lignocellulosic particles and/or other (additional) components such as plastics, fabrics, paint coat or the like, for example derived from foreign matter in waste wood. Individual layers preferably (i) comprise different binders and different lignocellulosic particles or (ii) comprise identical binders, but different lignocellulosic particles or (iii) comprise identical binders and identical lignocellulosic particles, but in different ratios.

According to a technically related preferred process of the present invention the preparation of a multilayer lignocellulosic composite comprises the preparation of two, three or more layers, each layer comprising lignocellulosic particles and a binder. Preferably the lignocellulosic particles and/or the binders in said two, three or more layers are the same or different, even more preferably the lignocellulosic particles are different and the binders are different.

Preferably, in step S2) of compacting the mixture provided or prepared in step S1), the compacting of the mixture is conducted in two stages. This means, that in a first stage the mixture is pre-compacted to give a pre-compacted mat, and in a second stage this precompacted mat is further compacted. Preferably, the first stage of pre-compacting the mixture to give a pre-compacted mat is carried out before step S3) of applying heat and/or pressure. The second stage of further compacting the pre-compacted mat is preferably carried out during step S3) of applying heat and/or pressure. This two-stage compacting allows for a flexible process for the production of a lignocellulosic composite or a layer of a lignocellulosic composite.

In a preferred process of the present invention the preparation of a single-layer lignocellulosic composite or a multilayer lignocellulosic composite comprises the following steps:

providing or preparing one, two or more than two mixtures at least comprising lignocellulosic particles and a binder according to the invention, scattering this mixture/these mixtures to give one, two or more than two layers, wherein the layer(s) form a mat, in a first compacting step pre-compacting this single-layer or multilayer mat to give a pre-compacted mat, and thereafter in a second compacting step compacting the pre-compacted mat while applying heat and/or pressure.

The present invention also relates to a binder composition for producing a lignocellulosic composite as used in and defined above with respect to the process according to the present invention for producing a lignocellulosic composite (or to a respective binder composition of the present invention as described herein as being preferred).

Generally, all aspects of the present invention discussed herein in the context of the process according to the present invention for producing a lignocellulosic composite apply mutatis mutandis to the binder composition of the present invention, and vice versa.

The present invention further relates to the use of the binder composition according to the present invention (or the use of a respective binder composition according to the present invention as described herein as being preferred), in a process for producing a lignocellulosic composite.

Generally, all aspects of the present invention discussed herein in the context of the process according to the present invention for producing a lignocellulosic composite and/or in the context of the binder composition of the present invention apply mutatis mutandis to the use of the binder composition of the present invention, and vice versa.

The present invention further relates to a lignocellulosic composite, obtainable or obtained according to a process according to the present invention as described herein (or according to a process of the present invention as described herein as being preferred), or a construction product comprising such lignocellulosic composite, wherein preferably the lignocellulosic composite is a lignocellulosic board selected from the group consisting of:

high-density fiberboard (HDF), medium-density fiberboard (MDF), low-density fiberboard (LDF), wood fiber insulation board, oriented strand board (OSB), chipboard, and natural fiber board, preferably with fibers from the group consisting of sisal, jute, flax, coconut, kenaf, hemp, banana, and mixtures thereof, wherein preferably the lignocellulosic board is a single-layer lignocellulosic board or multilayer lignocellulosic board, preferably a multilayer lignocellulosic board having a core and having an upper surface layer and a lower surface layer.

Generally, all aspects of the present invention discussed herein in the context of the process according to the present invention for producing a lignocellulosic composite and/or of the binder composition of the present invention and/or of the use of the binder composition of the present invention apply mutatis mutandis to the lignocellulosic composite of the present invention, and vice versa.

The term "construction product" as used herein designates products used for constructions such as decking, doors, windows, floors, panels, furniture or parts of furniture. The construction product of the present invention is preferably selected from the group consisting of furniture and parts of furniture.

The term "furniture" as used herein designates all kinds of furniture. In the context of the present invention, furniture is preferably selected from the group consisting of chairs, tables, desks, closets, beds and shelves.

The term "building element" as used herein designates lignocellulosic composite products (e.g., boards, see above) which constitute a part (element) of a construction product (e.g., a part of furniture). Such building elements preferably are parts of furniture, and more preferably such parts of furniture are selected from the group consisting of shelves, table plates, side boards or shelves or doors of cabinets, and side walls of beds.

The lignocellulosic composite, specifically board, of the present invention, in particular if it is an element of a construction product of the present invention, preferably comprises lignocellulosic particles selected from the group consisting of fibers, chips, strands, flakes, sawmill shavings and saw dust or mixtures thereof. These lignocellulosic particles are preferably derived from any type of lignocellulosic biomass such as birch, beech, alder, pine, spruce, larch, eucalyptus, linden, poplar, ash, fir, tropical wood, sisal, jute, flax, coconut, kenaf, hemp, banana, straw, cotton stalks, bamboo and the like or mixtures thereof.

A lignocellulosic composite, preferably board, of the present invention, obtainable or obtained according to a process of the present invention, preferably is a single-layer lignocellulosic board or a multilayer lignocellulosic board, more preferably is a single-layer lignocellulosic board. A multilayer lignocellulosic board of the present invention is a board comprising at least two distinguishable (individual) layers. The multilayer lignocellulosic board is preferably a board having at least a core layer as well as an upper surface layer and a lower surface layer. The total number of layers is then three or more. If the number of layers is four or more, there are one or more intermediate layers. Preferred is a three-layer board having one core layer, an upper surface layer and a lower surface layer. This is specifically relevant if the lignocellulosic composite, preferably board, of the present invention is an element of a construction product of the present invention.

Particularly preferred are a single-layer lignocellulosic board of the present invention that is a medium-density fiberboard (MDF) or a chipboard, even more preferably is a medium-density fiberboard (MDF), and a corresponding construction product comprising such single-layer lignocellulosic board.

The present invention also pertains to the use of a lignocellulosic composite according to the present invention as described herein (or to a respective lignocellulosic composite as described herein as being preferred) as building element in a construction product, preferably selected from products used for constructions selected from the group consisting of decking, doors, windows, floors, panels, furniture and parts of furniture.

Generally, all aspects of the present invention discussed herein in the context of the process according to the present invention for producing a lignocellulosic composite and/or of the binder composition of the present invention and/or of the use of the binder composition of the present invention and/or of the lignocellulosic composite of the present invention apply mutatis mutandis to the use of the lignocellulosic composite of the present invention, and vice versa.

The present invention then also relates to a kit for producing a binder composition for use in the production of a lignocellulosic composite, comprising as spatially separated, individual components at least:

k1) one or more amino acid polymers having two or more primary amino groups, as used in the process according to the present invention for producing a lignocellulosic composite and defined above with respect to component c1) of the binder composition (or respective amino acid polymers as described herein as being preferred);

k2) one or more alpha-hydroxy carbonyl compounds, as used in the process according to the present invention for producing a lignocellulosic composite and defined above with respect to component c2) of the binder composition (or respective alpha-hydroxy carbonyl compounds as described herein as being preferred);

and k3) one or more basic substances having a $pK_B$-value of ≤3, as used in the process according to the present invention for producing a lignocellulosic composite and defined above with respect to component c3) of the binder composition (or respective basic substances as described herein as being preferred).

Generally, all aspects of the present invention discussed herein in the context of the process according to the present invention for producing a lignocellulosic composite and/or of the binder composition of the present invention and/or of the use of the binder composition of the present invention and/or of the lignocellulosic composite of the present invention and/or to the use of the lignocellulosic composite of the present invention apply mutatis mutandis to the kit of the present invention, and vice versa.

EXAMPLES

The following examples are meant to further explain and illustrate the present invention without limiting its scope.

Materials

The following materials were used in the experiments described below:

1) Dextrose monohydrate, Sigma Aldrich, Spain;

2) L-Lysine solution (50% in water), ADM animal nutrition, USA;

3) Hydroxyacetone (95%), Alfa Aesar (now Thermo Fisher);

4) Sodium hydroxide (97% powder), Sigma Aldrich, USA;

5) Spruce wood chips and fibers (lignocellulosic particles) from Germany, Institut für Holztechnologie Dresden:

Spruce wood chips were produced in a disc chipper. Spruce trunk sections (length 250 mm) from Germany were pressed with the long side against a rotating steel disc, into which radially and evenly distributed knife boxes were inserted, each of which consisted of a radially arranged cutting knife and several scoring knives positioned at right angles to it.

The cutting knife separated the chip from the round wood and the scoring knives simultaneously limited the chip length. Afterwards the produced chips were collected in a bunker and were subsequently transported to a cross beater mill (with sieve insert) for re-shredding with regard to chip width. Then, the reshredded chips were conveyed to a flash drier and dried at approx. 120° C. The chips were then screened into two useful fractions ("B": ≤2.0 mm×2.0 mm and >0.32 mm×0.5 mm; "C": ≤4.0 mm×4.0 mm and >2.0 mm×2.0 mm), a coarse fraction ("D": >4.0 mm×4.0 mm), which was re-shredded, and a fine fraction ("A": ≤0.32 mm×0.5 mm). Fraction B was suitable for use as surface layer chips for three-layered chipboards (surface layer chips), a mixture of 60 wt.-% of fraction B and 40 wt.-% of fraction C was used as chips for single-layered chipboards but was also suitable as core layer chips for three-layered chipboards (core layer chips).

Methods:

1. Measuring of Residual Particle Moisture Content

The moisture content of the lignocellulosic particles (chips or fibers, see above) before application of the binder was measured according to EN 322:1993 by placing the particles in a drying oven at a temperature of (103±2) ° C. until constant mass was reached. The water content of the particle/binder composition mixtures obtained in step S1) was determined in an analogous manner. For this, a sample of the respective mixture (ca. 20 g) was weighed in moist condition ($m_1$) and after drying ($m_0$). The mass $m_0$ is determined by drying at 103° C. to constant mass. Water content was calculated as follows: water content [in wt. %]=[($m_1$−$m_0$)/$m_0$]≠100.

2. Measuring of Press Time Factor

For determining the "press time factor", a conventional hot press was used. For the purposes of the present invention, the "press time factor" was determined as the "press time" (i.e. the time from closing to opening of the press) divided by the "target thickness" of the lignocellulosic composite (board). The target thickness refers to the thickness of the lignocellulosic composite at the end of step S3) and was adjusted by the press conditions, i.e. by the distance between the top and bottom press plates, which is adjusted by the automatic distance control of the press.

The press time factor is given below in units of "[sec/mm]", i.e. the time from closing to opening of the press in [sec]: target thickness of the pressed board in [mm]. For example, when a 10 mm chipboard is made with a press time of 120 sec, a press time factor of 12 sec/mm results.

3. Measuring of Densities of Lignocellulosic Composites

The density of lignocellulosic composites (boards) was measured according to EN 323:1993 and is reported herein as the arithmetic average of ten 50×50 mm samples of the same lignocellulosic composite (board).

4. Measuring of Transverse Tensile Strength of Lignocellulosic Composites ("Internal Bond Strength")

Transverse tensile strength ("internal bond strength") of lignocellulosic composites (boards) was determined according to EN 319:1993 and is reported herein as the arithmetic average of ten 50×50 mm samples of the same lignocellulosic composite (board).

5. Determining the Amount of Binder or Binder Composition

The amount of binder or binder composition in the examples shown below are reported as the total weight of the sum of the respective components of the binder or binder composition in wt.-%, based on the total dry weight of the lignocellulosic particles (wood particles).

6. Determining the Weight-Average Molecular Weight ($M_w$) of Polylysines

The weight-average molecular weight ($M_w$) of polylysines as prepared according to the present examples was determined by generally known size exclusion chromatography under the following conditions:

Solvent and eluent: 0.1% (w/w) trifluoroacetate, 0.1 M NaCl in distilled water

Flow: 0.8 ml/min

Injection volume: 100 µl

Samples were filtrated with a Sartorius Minisart RC 25 (0.2 µm) filter

Column material: hydroxylated polymethacrylate (TSK-gel G3000PWXL)

Column size: inside diameter 7.8 mm, length 30 cm

Column temperature: 35° C.

Detector: DRI Agilent 1100 UV GAT-LCD 503 [232 nm]

Calibration was done with poly(2-vinylpyridine) standards in the molar mass range from 620 to 2890000 g/mole (from Polymer Standards Service GmbH, Mainz, Germany) and pyridine (79 g/mol).

The upper integration limit was set to 29.01 mL.

The calculation of $M_w$ included the lysine oligomers and polymers as well as the monomer lysine.

Example 1: Synthesis of Polylysines

Example 1a: Poly-L-lysine with $M_w$ 2100

2200 g of L-lysine solution was heated under stirring in an oil bath (external temperature 140° C.). Water was distilled off and the oil bath temperature was increased by 10° C. per hour until a temperature of 180° C. was reached. The reaction mixture was stirred for an additional hour at 180° C. (oil bath temperature) and then pressure was slowly reduced to 200 mbar. After reaching the target pressure, distillation was continued for 2 hours. The product was hotly poured out of the reaction vessel, crushed after cooling and dissolved in water to give a 50 wt.-% aqueous solution of poly-L-lysine (the "Polylysine Solution 1a" hereinafter). The weight-average molecular weight of the resulting poly-L-lysine was 2100 (for determination method see above).

Example 1 b: Poly-L-Lysine with $M_w$ 3690

The experiment of example 1a as described above was repeated. Different from example 1a, the distillation after reaching the target pressure was continued for 4 hours (instead of for 2 hours). A 50 wt.-% aqueous solution of poly-L-lysine (the "Polylysine Solution 1b" hereinafter) was finally obtained. The weight-average molecular weight of the resulting poly-L-lysine was 3690 (for determination method see above).

Example 1c: Poly-L-Lysine with $M_w$ 6270

The experiment of example 1a as described above was repeated. Different from example 1a, the distillation after reaching the target pressure was continued for 4.5 hours (instead of for 2 hours). A 50 wt.-% aqueous solution of poly-L-lysine (the "Polylysine Solution 1c" hereinafter) was finally obtained. The weight-average molecular weight of the resulting poly-L-lysine was 6270 (for determination method see above).

Example 2: Single-Layered Lignocellulosic Composites Poly-L-Lysine/Hydroxyacetone (for Comparison)

Example 2a: Single-Layered Lignocellulosic Composite with Poly-L-Lysine of $M_w$ 2100/Hydroxyacetone (for Comparison)

In a mixer, 499 g of Polylysine Solution 1a (for preparation see example 1a above) was sprayed onto 5.56 kg (5.40 kg dry weight plus 160 g water from residual particle moisture content) of spruce core layer chips (moisture content 3.0 wt.-%) while mixing. Immediately, 149 g of a hydroxyacetone solution (50 wt.-% in water) was sprayed onto the mixture while mixing. Finally, 90 g of water was sprayed onto the mixture while mixing to adjust the final moisture of the resinated chips. After addition of the water, mixing was continued for 3 min.

The term "resinated chips" is used herein for the mixture of the chips with the binder composition and additionally added water (and similarly "resination").

The binder amount (or proportion of binder in the finished lignocellulosic composite) was calculated as follows:

$$[499\ \text{g}\times 0.5\ \text{of component}\ c1)] + [149\ \text{g}\times 0.5\ \text{of component}\ c2)] : 5400\ \text{g lignocellulosic particles} = 6.0\%$$

The ratio of the binder components was calculated as follows:

$$[499\ \text{g}\times 0.5\ \text{of component}\ c1)]:[149\ \text{g}\times 0.5\ \text{of component}\ c2)] = 77:23$$

The moisture content of the mixture provided or prepared in step S1) was calculated as follows:

$$\text{Total weight of water} = 499\ \text{g}\times 0.5\ \text{(from Polylysine Solution}\ 1a) + 149\ \text{g}\times 0.5\ \text{(from hydroxyacetone solution)} + 90\ \text{g (from additional water)} + 160\ \text{g (from chips moisture)} = 574\ \text{g}$$

$$\text{Total weight of solids} = 499\ \text{g}\times 0.5\ \text{(from Polylysine Solution}\ 1a) + 149\ \text{g}\times 0.5\ \text{(from hydroxyacetone solution)} + 5400\ \text{g (dry chips)} = 5724\ \text{g}$$

$$\text{Resulting moisture content} = 574\ \text{g}/5724\ \text{g} = 10.0\%$$

This water content was checked and confirmed by a method performed analogously to EN 322:1993, resulting in a water content of 10%.

Immediately after resination, 1.10 kg of the mixture were scattered into a 30×30 cm mold and pre-pressed under ambient conditions (0.4 N/mm$^2$). Subsequently, the pre-pressed chip mat thus obtained was removed from the mold, transferred into a hot press and pressed to a thickness of 16 mm to give a chipboard (temperature of the press plates 210° C., max pressure 4 N/mm$^2$, press time as shown by press time factor in table 1 below) as a single-layered lignocellulosic composite (referred to as "SLC 2a C (HA)" in table 1).

Example 2b: Single-Layered Lignocellulosic Composite with Poly-L-Lysine of $M_w$ 3690/Hydroxyacetone (for Comparison)

The experiment of example 2a as described above was repeated. Different from example 2a, 499 g of Polylysine Solution 1b (for preparation see example 1b above) was used. From this experiment, a single-layered lignocellulosic composite (referred to as "SLC 2b C (HA)" in table 1) resulted.

Example 2c: Single-Layered Lignocellulosic Composite with Poly-L-Lysine of $M_w$=6270/Hydroxyacetone (for Comparison)

The experiment of example 2a as described above was repeated. Different from example 2a, 499 g of Polylysine Solution 1c (for preparation see example 1c above) was used. From this experiment, a single-layered lignocellulosic composite (referred to as "SLC 2c C (HA)" in table 1) resulted.

Example 3: Single-Layered Lignocellulosic Composite Poly L-Lysines/Hydroxyacetone (According to the Invention)

Example 3a: Single-Layered Lignocellulosic Composite with Poly-L-Lysine of $M_w$ 2100/Hydroxyacetone (According to the Invention)

20.0 g sodium hydroxide was added to 499 g of Polylysine Solution 1a and stirred, to give a Polylysine Solution 1a-NaOH.

In a mixer, 519 g of Polylysine solution 1a-NaOH was sprayed onto 5.56 kg (5.40 kg dry weight plus 160 g water from residual particle moisture content) of spruce core layer chips (moisture content 3.0 wt.-%) while mixing. Immediately, 149 g of a hydroxyacetone solution (50 wt.-% in water) was sprayed onto the mixture while mixing. Finally, 90 g of water was sprayed onto the mixture while mixing, to adjust the final moisture of the resinated chips. After addition of the water mixing was continued for 3 min.

From the binder composition as prepared above, a single-layer lignocellulosic composite (referred to as "SLC 3a I (HA)" in table 1) was prepared as described in example 2a.

Example 3b: Single-Layered Lignocellulosic Composite with Poly-L-Lysine of $M_w$ 3690/Hydroxyacetone (According to the Invention)

The experiment of example 3a as described above was repeated. Different from example 3a, 499 g of Polylysine Solution 1b (for preparation see example 1b above) was used (instead of Polylysine Solution 1a). From this experiment, a single-layered lignocellulosic composite (referred to as "SLC 3b C (HA)" in table 1) resulted.

Example 3c: Single-Layered Lignocellulosic Composite with Poly-L-Lysine of $M_w$ 6270/Hydroxyacetone (According to the Invention)

The experiment of example 3a as described above was repeated. Different from example 3a, 499 g of Polylysine Solution 1c (for preparation see example 1c above) was used (instead of Polylysine Solution 1a). From this experiment, a single-layered lignocellulosic composite (referred to as "SLC 3c C (HA)" in table 1) resulted.

Example 4: Single-Layered Lignocellulosic Composite Polylysine/Dextrose (for Comparison)

In a mixer, 499 g of Polylysine Solution 1a (50 wt.-% in water) was sprayed onto 5.56 kg (5.40 kg dry weight plus 160 g water from residual particle moisture content) of spruce core layer chips (moisture content 3.0 wt. %) while mixing. Immediately, 149 g of a dextrose solution (50 wt.-% in water) was sprayed onto the mixture while mixing. Finally, 90 g of water was sprayed onto the mixture while mixing to adjust the final moisture of the resinated chips. After addition of the water, mixing was continued for 3 min.

From the binder composition as prepared above, a single-layer lignocellulosic composite (referred to as "SLC 4 C (DEX)" in table 1) was prepared as described in example 2.

Example 5: Single-Layered Lignocellulosic Composite Polylysine/Dextrose (According to the Invention)

In a mixer, 519 g of Polylysine Solution 1a-NaOH (for preparation see example 3 above) was sprayed onto 5.56 kg (5.40 kg dry weight plus 160 g water from residual particle moisture content) of spruce core layer chips (moisture content 3.0 wt.-%) while mixing. Immediately, 149 g of a dextrose solution (50 wt.-% in water) was sprayed onto the mixture while mixing. Finally, 90 g of water was sprayed onto the mixture while mixing to adjust the final moisture of the resinated chips. After addition of the water, mixing was continued for 3 min.

From the binder composition as prepared above, a single-layer lignocellulosic composite (referred to as "SLC 5 I (DEX)") was prepared as described in example 2.

Example 6: Determining Parameters of Lignocellulosic Composites

For the single-layer lignocellulosic composites prepared according to examples 2 to 5, certain board parameters were determined and are shown in table 1 below:

TABLE 1

Parameters of lignocellulosic composites

| Lignocellulosic composite | NaOH amount (solid/solid of binder) [wt.-%] | Press time factor [s/mm] | Board density [kg/m$^3$] | Internal bond strength [N/mm$^2$] |
|---|---|---|---|---|
| SLC 2a C (HA) | 0 | 6 | 694 | 0.67 |
| | 0 | 8 | 702 | 0.81 |
| SLC 2b C (HA) | 0 | 6 | 693 | 0.60 |
| SLC 2c C (HA) | 0 | 6 | 643 | 0.51 |
| SLC 3a I (HA) | 6 | 6 | 696 | 0.86 |
| | 6 | 8 | 698 | 0.94 |
| SLC 3b I (HA) | 6 | 6 | 704 | 0.81 |
| SLC 3c I (HA) | 6 | 6 | 661 | 0.62 |
| SLC 4 C (DEX) | 0 | 8 | No board | No board |
| | 0 | 12 | 629 | 0.1 |
| SLC 5 I (DEX) | 6 | 8 | 651 | 0.12 |
| | 6 | 12 | 671 | 0.32 |

"No board" in table 1 above means that the resulting material after pressing was not a sound chipboard and showed fractures, blows and/or bursts.

From the data shown in table 1 above it can i.a. be seen that the presence of a basic substance having a p$K_B$-value of ≤3 (NaOH) in the binder composition used in the process of the present invention results in an increased internal bond strength of a lignocellulosic composite produced in said process.

The invention claimed is:

1. A process for producing a lignocellulosic composite comprising one or more lignocellulosic composite layers, comprising at least the following steps:

S1) providing or preparing a mixture, at least comprising:
  lignocellulosic particles and
  a binder composition, comprising as components at least:
    c1) one or more amino acid polymers having two or more primary amino groups, wherein the one or more amino acid polymers comprise or are one or more polylysines, wherein
    the one or more polylysines have a weight-average molecular weight $M_w$ of 800 g/mol and
    comprise as monomers integrated in their polymer structure at least 85 mass-% of lysine monomers, based on the total mass of the polymer structure;
    c2) one or more alpha-hydroxy carbonyl compounds, wherein components c1) and c2) are a binder; and
    c3) one or more basic substances having a p$K_B$-value of ≤3, S2) compacting the mixture from step S1) to receive a compacted mixture, and S3) applying heat and/or pressure to the mixture, so that the binder of the binder composition hardens and a lignocellulosic composite results.

2. The process according to claim 1, wherein the one or more amino acid polymers of component c1) of the binder composition comprise or are one or more polylysines, wherein the one or more polylysines have a weight-average molecular weight $M_w$ of ≥1000 g/mol; and/or have a weight-average molecular weight $M_w$ of ≤10000 g/mol; and/or have a weight-average molecular weight $M_w$ in the range of 800 g/mol≤$M_w$≤10000 g/mol; and/or comprise as monomers integrated in their polymer structure at least 95 mass-% of lysine monomers, based on the total mass of the polymer structure.

3. The process according to claim 1, wherein the one or at least one of the more alpha-hydroxy carbonyl compounds of component c2) of the binder composition is selected from the group consisting of glycolaldehyde, glyceraldehyde, 1,3-dihydroxyacetone, hydroxyacetone, arabinose, xylose, glucose, mannose, fructose, saccharose and mixtures thereof, and/or the ratio of (i) the total mass of the one or more amino acid polymers of component c1) of the binder composition: (ii) the total mass of the one or more alpha-hydroxy carbonyl compounds of component c2) of the binder composition or used for the preparation of the binder composition is in the range of ≥60:40 to ≤90:10.

4. The process according to claim 1, wherein the one or at least one of the more alpha-hydroxy carbonyl compounds is hydroxyacetone.

5. The process according to claim 1, wherein the one or more basic substances having a p$K_B$-value of ≤3 are one or more substances having a p$K_B$-value of ≤2.5; and the one or at least one of the more basic substances having a p$K_B$-value of ≤3 are selected from the group consisting of:

alkali metal hydroxides; and earth alkali metal hydroxides; and/or the total amount of component c3), the one or more basic substances having a $pK_B$-value of ≤3, is in the range of from ≥3 to ≤9 mass-%, relative to the total amount of component c1), the one or more amino acid polymers of the binder composition, and component c2), the one or more alpha-hydroxy carbonyl compounds of the binder composition.

6. The process according to claim 5, wherein the alkali metal hydroxides are selected from the group consisting of LiOH, NaOH, KOH, and mixtures thereof.

7. The process according to claim 1, wherein the binder composition provided or prepared in step S1) further comprises a carrier liquid.

8. The process according to claim 7, wherein component c1), the one or more amino acid polymers, is present in or used for the preparation of the binder composition in a total amount in the range of from ≥20 to ≤50 mass-%, relative to the totalized mass of components c1) to c3) and carrier liquid; and/or component c2), the one or more alpha-hydroxy carbonyl compounds, is present in or used for the preparation of the binder composition in a total amount in the range of from ≥3 to ≤20 mass-%, relative to the total mass of components c1) to c3) and carrier liquid.

9. The process according to claim 1, wherein in the mixture provided or prepared in step S1) of the process, the total amount of component c1), the one or more amino acid polymers of the binder composition, and of component c2), the one or more alpha-hydroxy carbonyl compounds of the binder composition, is in the range of from ≥3 to ≤8 mass %, relative to the total amount of the lignocellulosic particles in an oven-dry state of the mixture.

10. The process according to claim 1, wherein in step S1) components c1) and c3) are premixed with each other and subsequently the resulting pre-mixture is contacted with said lignocellulosic particles.

11. The process according to claim 1, wherein the lignocellulosic composite is a lignocellulosic board selected from the group consisting of high-density fiberboard (HDF);

medium-density fiberboard (MDF);

low-density fiberboard (LDF);

wood fiber insulation board;

oriented strand board (OSB);

chipboard; and natural fiber board;

wherein the lignocellulosic board is a single-layer lignocellulosic board or multilayer lignocellulosic board.

12. The process according to claim 1, wherein the process of producing a lignocellulosic composite comprises one, two, three, more than three, or all of the following steps preparing a layer of the mixture provided or prepared in step S1), and in step S2) compacting this layer, preparing a multilayer lignocellulosic composite comprising one or more lignocellulosic composite layers, providing or preparing at least a first and a second individual mixture, and using said first and second individual mixtures for making a first and a second layer of the multilayer lignocellulosic composite, and/or wherein the first and the second individual mixture have the same composition or have different compositions, preparing a multilayer lignocellulosic composite, preparing two or more layers, each layer comprising lignocellulosic particles and a binder, wherein in the two or more layers the lignocellulosic particles and/or the binders are the same or different, compacting, in step S2), the mixture in two stages, wherein in the first stage the mixture is pre-compacted to give a pre-compacted mat, and wherein in the second stage this pre-compacted mat is further compacted;

during or after compacting in step S2), hot pressing the mixture, and applying in step S3) a temperature in the range of from 80 to 300° C. and a pressure in the range of from of 0.1 to 10 MPa to the compacted mixture from step S2).

* * * * *